United States Patent
Kobayashi et al.

(10) Patent No.: US 7,206,943 B2
(45) Date of Patent: Apr. 17, 2007

(54) DISPLAY UNIT STORING AND USING A CRYPTOGRAPHY KEY

(75) Inventors: Osamu Kobayashi, Sunnyvale, CA (US); Ali Noorbakhsh, Danville, CA (US); Chia-Lun Hang, Morgan Hill, CA (US); Jih-Hsien Soong, Cupertino, CA (US); Tzoyao Chan, Saratoga, CA (US)

(73) Assignee: Genesis Microchip Inc., Alviso, CA (US)

( * ) Notice: Subject to any disclaimer, the term of this patent is extended or adjusted under 35 U.S.C. 154(b) by 170 days.

(21) Appl. No.: 10/813,346

(22) Filed: Mar. 29, 2004

(65) Prior Publication Data

US 2004/0186991 A1 Sep. 23, 2004

Related U.S. Application Data

(63) Continuation of application No. 09/652,415, filed on Aug. 31, 2000, now Pat. No. 6,845,450.

(60) Provisional application No. 60/184,999, filed on Feb. 25, 2000.

(51) Int. Cl.
*H04L 9/32* (2006.01)
*G06F 12/14* (2006.01)
*G06F 11/30* (2006.01)
*H04L 9/00* (2006.01)

(52) U.S. Cl. .................. 713/193; 713/189; 380/201; 380/277

(58) Field of Classification Search ............... None
See application file for complete search history.

(56) References Cited

U.S. PATENT DOCUMENTS

| 5,142,578 | A | * | 8/1992 | Matyas et al. ............ 380/280 |
| 5,237,610 | A | | 8/1993 | Gammie et al. |
| 5,481,610 | A | * | 1/1996 | Doiron et al. ............ 380/270 |
| 6,014,745 | A | | 1/2000 | Ashe |
| 6,061,451 | A | | 5/2000 | Muratani et al. |
| 6,085,323 | A | | 7/2000 | Shimizu et al. |
| 6,584,552 | B1 | | 6/2003 | Kuno et al. |

OTHER PUBLICATIONS

High-bandwidth Digital Content Protection Systems, Revision 1.0, Intel Corporation, Feb. 17, 2000, pp. 2-60.*
Digital Display Working Group "High-Bandwidth Digital Content Protection System", Revision 1.0, Feb. 17, 2000.
Philips Semiconductors, "The 12C-Bus Specification", Jan. 2000, Version 2.1, p. 4.

* cited by examiner

*Primary Examiner*—Taghi T. Arani
*Assistant Examiner*—Arezoo Sherkat
(74) *Attorney, Agent, or Firm*—Beyer Weaver LLP

(57) ABSTRACT

Keys (e.g., decryption key, authentication key) are stored in a non-volatile memory of a display unit. The keys are retrieved in encrypted form into an integrated circuit. The integrated circuit decrypts the keys and uses the keys. As the keys are available in decrypted form only within the integrated circuit and potentially only during use, the keys may not be available to unauthorized third parties.

19 Claims, 4 Drawing Sheets

DISPLAY UNIT STORING AND USING A CRYPTOGRAPHY KEY

RELATED APPLICATIONS

This application is a continuation of U.S. application Ser. No. 09/652,415, filed Aug. 31, 2000, now U.S. Pat. No. 6,845,450 entitled "Display Unit Storing and Using a Cryptography Key" which claims priority from U.S. Provisional Application Ser. No. 60/184,999, Entitled, "Display Unit Storing and Using a Cryptography Key", filed on Feb. 25, 2000, which are hereby incorporated by reference.

BACKGROUND OF THE INVENTION

1. Field of the Invention

The present invention relates to display units used with cryptography technologies, and more specifically to a method and apparatus for storing and using a cryptography key.

2. Related Art

Display units are often used to receive and display data encoded in a display signal received on a serial communication channel. As used in the present application, display units contain both analog display units (typically based on cathode ray tube technology) and digital display units (typically based on flat panels). The display signal generally contains data representing image frames and synchronization signals (e.g., VSYNC and HSYNC) indicative of the line and frame boundaries.

It may be necessary to implement cryptography applications in display units. In a common cryptography application, underlying data is encrypted at a sending location and transferred to a receiving location. The encrypted data is then decrypted at a receiving end to recover the original data. Due to the encryption and decryption, an unauthorized third party may be unable to decipher (or even alter) the underlying data when the data is transmitted from the sending location to the receiving location.

One common application of cryptography is when a display unit needs to decrypt data encoded in a received display signal. The data is typically encrypted to avoid illegal copying of the data when the display signal is being transmitted. For example, a graphics controller of a computer system may encrypt data representing image frames and send the encrypted data in a serial communication channel, and it may be necessary to decrypt the data in the display unit so that the image frames can be displayed.

Keys are commonly used in cryptography. Examples of such keys include an encryption key used to encrypt data, a decryption key to decrypt the data, and an authentication key to authenticate the source sending data. Details of guidelines (standards) for implementation of cryptography are provided in further detail in a document entitled, "High Bandwidth Digital Content Protection System, Revision 1.0" dated Feb. 17, 2000, and available from Digital Display Working Group (DDWG), which is incorporated in its entirety herewith.

Preventing unauthorized access to keys used in cryptography is often important. For example, the encrypted data can often be decrypted by an unauthorized party if the party has access to the decryption key. Therefore, what is needed is a method and apparatus which prevents (or substantially discourages) unauthorized access to keys.

SUMMARY OF THE INVENTION

An aspect of the present invention provides a secure way of storing and using keys. The keys are stored in encrypted format in a non-volatile memory. The key in the unencrypted form is referred to as an 'unencrypted key' and the key in the encrypted form is referred to as an 'encrypted key'. When the key is to be used, an integrated circuit retrieves the encrypted key from the non-volatile memory, decrypts the key and then uses the decrypted key (which equals the unencrypted key). For example, the integrated circuit may retrieve an encrypted authentication key from the non-volatile memory, decrypt the authentication key, and then use the decrypted authentication key for authentication.

As the keys are stored in encrypted format, an unauthorized user may not be able to decipher the keys by examining the non-volatile memory. In addition, as the key is in encrypted format when retrieved from the non-volatile memory, the key may not be deciphered merely by examining (probing) a bus on which the key is retrieved from the non-volatile memory. Furthermore, as the key is decrypted within an integrated circuit which uses the key, access to the key is further restricted.

A display unit provided according to an aspect of the present invention may thus contain a non-volatile memory (e.g., EEPROM). A master block (external to the display unit) may be used to generate a key, and the key is provided to the display unit. An encryption circuit encrypts the key according to a protocol and stores resulting encrypted key in the non-volatile memory.

A decryption circuit within the display unit then retrieves the encrypted key, decrypts the key, and uses the decrypted key. The decrypted key may be used for authenticating any subsequently received data. As another example, the decrypted key may be used as a decryption key for decrypting any subsequently received data in a way well known in the relevant arts.

Using the above approach, a component provider may provide a monolithic integrated circuit which contains the encryption and decryption circuits. An OEM (original equipment manufacturer) may provide a key to the encryption circuit, which encrypts the key and stores the encrypted key in a non-volatile memory. When the key is required, the encrypted key is retrieved and decrypted.

Accordingly, a provider may manufacture similar monolithic integrated circuits for many OEMs, and the OEMs may store OEM specific keys in the display units. The keys need not be shared with the providers of the monolithic integrated circuits. As a result, the OEMs may ensure the availability of the key without the fear of comprising security by sharing the keys with the providers.

Therefore, an aspect of the present invention is particularly useful for OEMs as the OEMs may provide keys to the units without having to share the keys with the component providers.

An aspect of the present invention makes it difficult for an unknown third party to access keys as the keys are stored in an encrypted form in a non-volatile memory and the key may be retrieved from the memory only in encrypted form.

Another aspect of the present invention makes it difficult for an unknown third party to access the keys as the key may be available in decrypted form only within the integrated circuits during actual use.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention is described in the context of a display unit which stores one or more keys in encrypted format ("encrypted key") in a non-volatile memory. When the key is to be used, an integrated circuit retrieves the encrypted key from the non-volatile memory, decrypts the key and then uses the decrypted key. For example, the integrated circuit may retrieve an encrypted authentication key from the non-volatile memory, decrypt the authentication key, and then use the authentication key for authentication.

As the keys are stored in encrypted format, an unauthorized user may not be able to decipher the keys by examining the non-volatile memory. In addition, as the key is in encrypted format when retrieved from the non-volatile memory, the key may not be deciphered merely by examining (probing) a bus on which the key is retrieved from the non-volatile memory. Furthermore, as the key is decrypted within an integrated circuit which uses the key, access to the key is further restricted.

The present invention is described below with reference to several examples for illustration. One skilled in the relevant art, however, will readily recognize that the invention can be practiced in other environments without one or more of the specific details, or with other methods, etc. In other instances, well-known structures or operations are not shown in detail to avoid obscuring the invention.

2. Example Environment

In general, the present invention can be implemented in any display unit, for example, used in conjunction with computer systems, DVD Players, HDTV televisions, etc. However, the invention is described below with reference to computer systems for illustration. A computer system may be one of, without limitation, lap-top and desk-top personal computer systems, work-stations, special purpose computer systems, general purpose computer systems, network computers, and many others. The invention may be implemented in hardware, software, firmware, or combination of the like.

Figure 1:
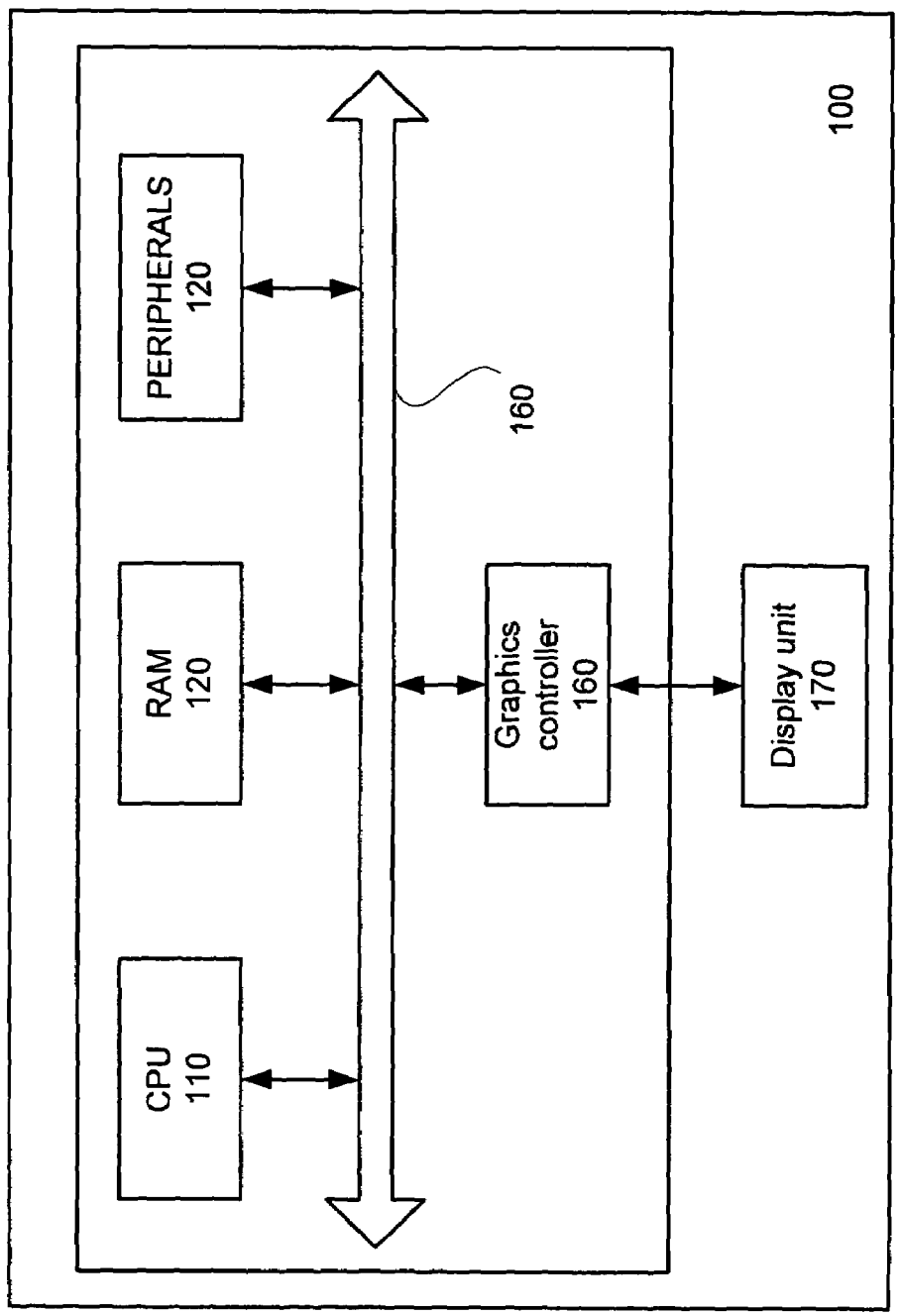
FIG. 1 is a block diagram of a computer system implemented in accordance with the present invention.

FIG. 1 is a block diagram of computer system 100 illustrating an example environment in which the present invention can be implemented. Computer system 100 includes central processing unit (CPU) 110, random access memory (RAM) 120, one or more peripherals 130, graphics controller 160, and digital display unit 170. CPU 110, RAM 120 and graphics controller 160 are typically packaged in a single unit, and such a unit is referred to as source 199 as the unit generates and transmits a sequence of symbols on a serial communication channel. All the components in graphics source 199 of computer system 100 communicate over bus 150, which can in reality include several physical buses connected by appropriate interfaces.

RAM 120 stores data representing commands and possibly pixel data elements representing a source image. CPU 110 executes commands stored in RAM 120, and causes different commands and pixel data elements to be transferred to graphics controller 160. Peripherals 130 can include storage components such as hard-drives or removable drives (e.g., DVD drive, floppy-drives). Peripherals 130 can be used to store commands and/or data which enable computer system 100 to operate in accordance with the present invention. By executing the stored commands, CPU 110 provides the electrical and control signals to coordinate and control the operation of various components in graphics source 199. Graphics controller 160 receives data/commands from CPU 110, and generates pixel data elements representative of source images to be displayed on digital display unit. Graphics controller 160 then encodes the data as symbols in a serial communication channel. The symbols may be sent in an encrypted format. The resulting signal ("display signal") may contain synchronization signals also in addition to the data. The display signal may be transferred according to standards such as Digital Flat Panel (DFP) and Digital Video Interface (DVI) well known in the relevant arts.

Display unit 170 may receive a display signal in TMDS format from graphics controller 160, and displays the source images encoded in the display signal. As the symbols (data) may be encoded in an encrypted format, display unit 170 first decrypts the symbols to recover the pixel data elements representing a source image. The corresponding source images are then displayed. The display unit may provide for authentication also. As is well known, decryption and authentication type acts require keys.

As described below in further detail, the present invention enables the keys to be stored in a non-volatile memory while minimizing the risk that an unknown third party can access the keys. The components of the digital display unit as relevant to the present invention are described below in further detail. The details of display unit are then described in further detail. For further details on the operation of the components, the reader is referred to the co-pending application Ser. No. 09/406,332; Filing Date: Sep. 27, 1999, entitled, "Receiver to Recover Data Encoded in a Serial Communication Channel", which is incorporated in its entirety herewith.

3. Use of Key

Figure 2:
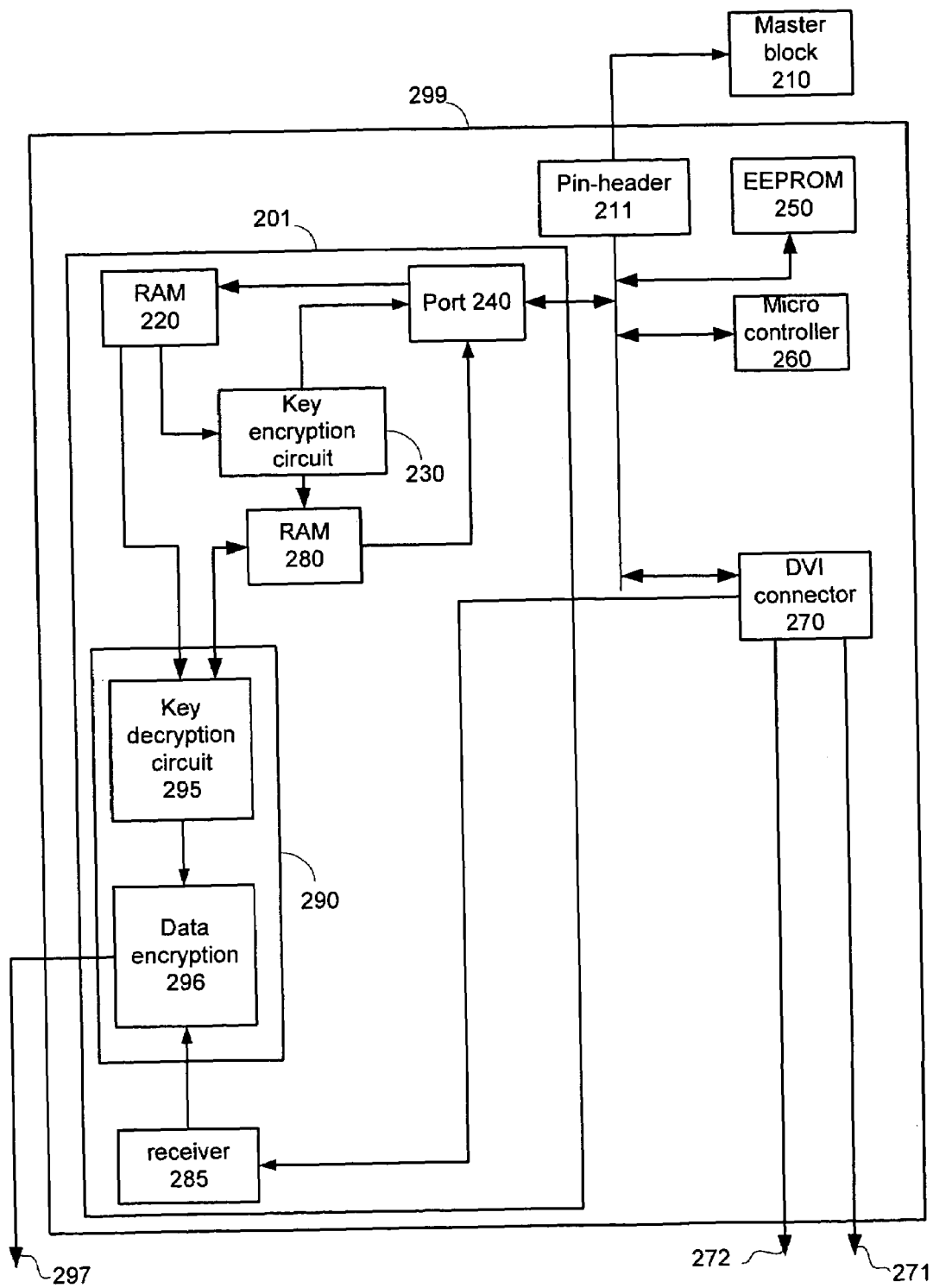
FIG. 2 is a block diagram the manner in which a key can be stored and used in accordance with the present invention.

FIG. 2 is a block diagram of apparatus 200 illustrating the manner in which keys are stored and used in accordance with the present invention. Apparatus is shown containing printed circuit board (PCB) 299 and master block 210. PCB 299 (or parts thereof) are referred to as components which are provided by component providers such as Genesis Microchip Corporation (the assignee of the present application). OEMs (original equipment manufacturers) such as Sony Corporation and Compaq Corporation integrate such components into units such as display units.

In operation, an OEM uses master block 210 to provide keys ("encrypted keys") to printed circuit board (PCB) 299. The keys may be generated either internal or external to master block 210, and may be provided in an unencrypted format. The key may be provided in unencrypted form to PCB 299 using VC protocol well known in the relevant arts. As described below in further detail, PCB 299 stores the key(s) in an encrypted form/format ("encrypted key") in a non-volatile memory, and decrypts the keys when required for use.

PCB 200 may contain monolithic integrated circuit 201, pin header 211, EEPROM 250, micro-controller 260 and DVI (digital video interface) connector 270. Integrated circuit 201 is in turn shown to contain RAM 220, key encryption circuit 230, port 240, the High-bandwidth Digital Content Protection (HDCP) engine 290 (containing key decryption circuit 295 and data decryption circuit 296), and receiver 285. Each component is described below in further detail.

Pin header 211 may contain two pins (consistent with $I^2C$ protocol) and provides the physical interface to communicate with master block 210. The data received by pin header 211 includes keys which are stored and used in accordance with various aspects of the present invention.

Port 240 receives an unencrypted key and places the key in random access memory (RAM) 220, which can also be implemented as multiple registers. Key encryption circuit 230 encrypts the key according to an encryption protocol and stores the encrypted key in RAM 280. The encrypted key can be written directly into serial EEPROM 250 by key check and encrypt 230 if such a feature is available. Alternatively, master block 210 may retrieve the encrypted key from RAM 280, and write the encrypted key into serial EEPROM 250.

One problem with the above embodiment is that an unauthorized third party may retrieve the encrypted key multiple times and attempt to decipher the unencrypted key. To discourage such attempts, support for multiple encryption/decryption protocols (for encrypting the keys) may be provided within integrated circuit 201, and the keys may be encrypted according to one of the protocols. The OEM may specify the specific protocol by using appropriate commands. The data indicating the specific protocol may also be stored thereafter in serial EEPROM 250 to facilitate later decryption by HDCP engine 290.

As a further deterrent against unauthorized deciphering of the keys, the OEM may be required to provide a secret key (generated based on a protocol provided by the component manufacturer), and the appropriate encrypted key may be provided only if the secret key is deemed to authenticate the OEM. As a result, third parties may be unable to access or decipher the keys stored and used in accordance with the present invention.

Using the noted approaches of above, several keys may be written into EEPROM 250. For example, the keys may include authentication key and a decryption key. The manner in which these keys are used is described below in further detail. DVI connector 270 may receive any cryptography related commands from graphics controller using, for example, $I^{2C}$ protocol on path 272. As an illustration, DVI connector 270 may receive a request to authenticate along with any necessary parameters. The authentication request is passed to HDCP engine 290 in integrated circuit 201. HDCP engine 290 retrieves the encrypted authentication key from serial EEPROM 250 via RAM 220, and decrypts it according to a corresponding decryption algorithm.

The decrypted authentication key can be used to provide a response to the authentication request. Once the authentication key is decrypted, the response to the authentication can be generated in a known way. Path 272 may be used to implement the communication for the authentication.

DVI connector 270 is shown connected to two paths, VC path 272 and display signal path 271. $I^2C$ path 272 may be used to send and receive various security related commands (e.g., authentication sequence as noted above) using the VC well known in the relevant arts. DVI connector 270 may receive data in encrypted format, for example, from the graphics controller in TMDS format on path 271. The signals are forwarded to receiver 285 in integrated circuit 201. Receiver 285 recovers the data representing the encrypted pixel data element values and forwards the recovered data to HDCP engine 290, which is shown containing data decrypt block 296 and key decrypt block 295. Key decryption block 295 receives the decryption key from serial EEPROM 250 via RAM 220, and decrypts the encrypted decryption key according to a decryption algorithm consistent with the encryption algorithm with which the decryption key may have been earlier encrypted. The decrypted key is forwarded to data decrypt block 296. External micro 260 coordinates and controls different components in printed circuit board 299. It should be noted that the decrypted keys are available only in integrated circuit 201, that too only when the circuit is operational. Accordingly, unauthorized third parties may be unable to access the decrypted key even by snooping the buses from which the keys are retrieved from non-volatile serial EEPROM 250. As a result, the keys used in accordance with the present 10invention may be prone less to unauthorized accesses.

Data decryption block 296 decrypts the data recovered by receiver 285. As the resulting decrypted data represents pixel data elements forming image frames, a display unit may display the images, for example, as described below.

4. Example Display Unit

Figure 3:
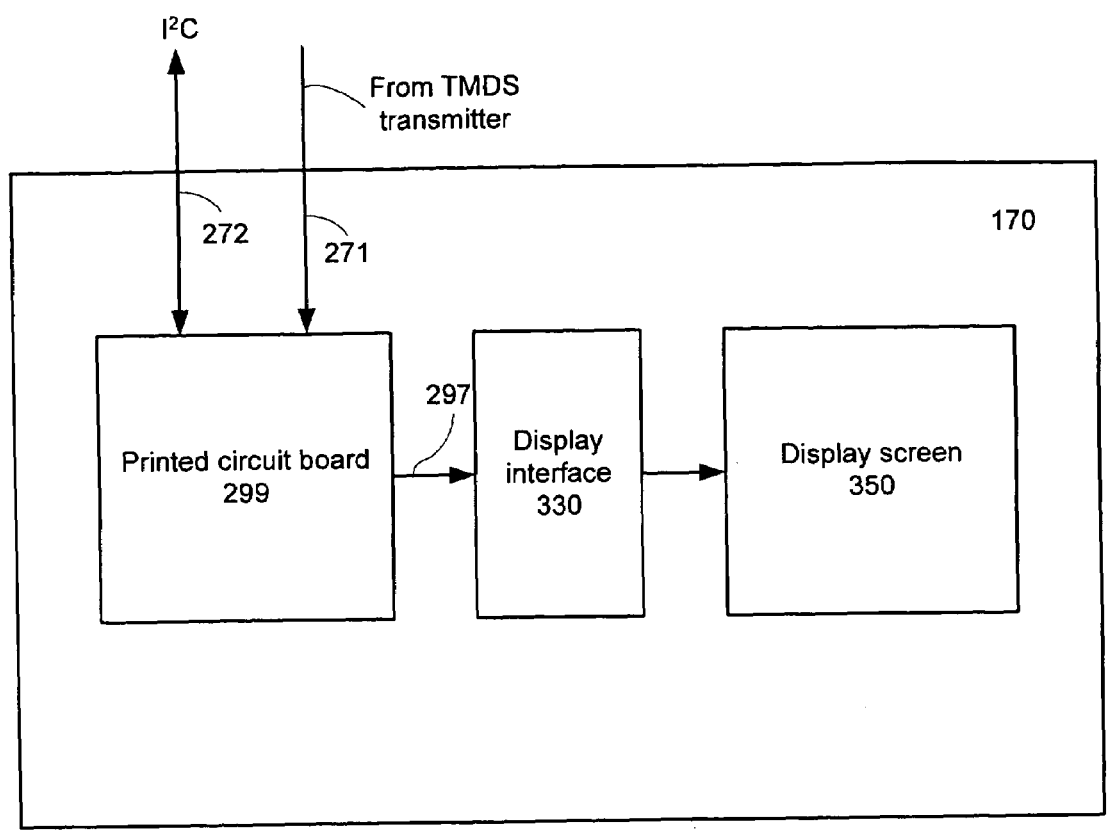
FIG. 3 is a block diagram illustrating a display unit implemented in accordance with the present invention.

FIG. 3 is a block diagram illustrating an example embodiment of display unit 170. Display unit 170 is shown containing printed circuit board 299, display interface 330, and display screen 350. As described above, printed circuit board 299 receives encrypted pixel data elements from a graphics controller on path 271, and generates the decrypted data on path 297.

Display interface 330 receives the decrypted data containing pixel data elements on path 297. Display interface 330 is implemented consistent with the interface requirements of display screen 350. Display screen 350 can be an analog display screen scanned using CRT technology or a flat panel. Alternatively, display screen 350 may be a digital display screen based on flat panel monitor. Display interface 330 generates the corresponding display signals to cause the images represented by the pixel data elements to be displayed on display screen 350.

Thus, the present invention provides a display unit which enables keys to be stored and used while minimizing the risk of unauthorized access of the keys. A method in accordance with the present invention may be summarized as following.

5. Method

Figure 4:
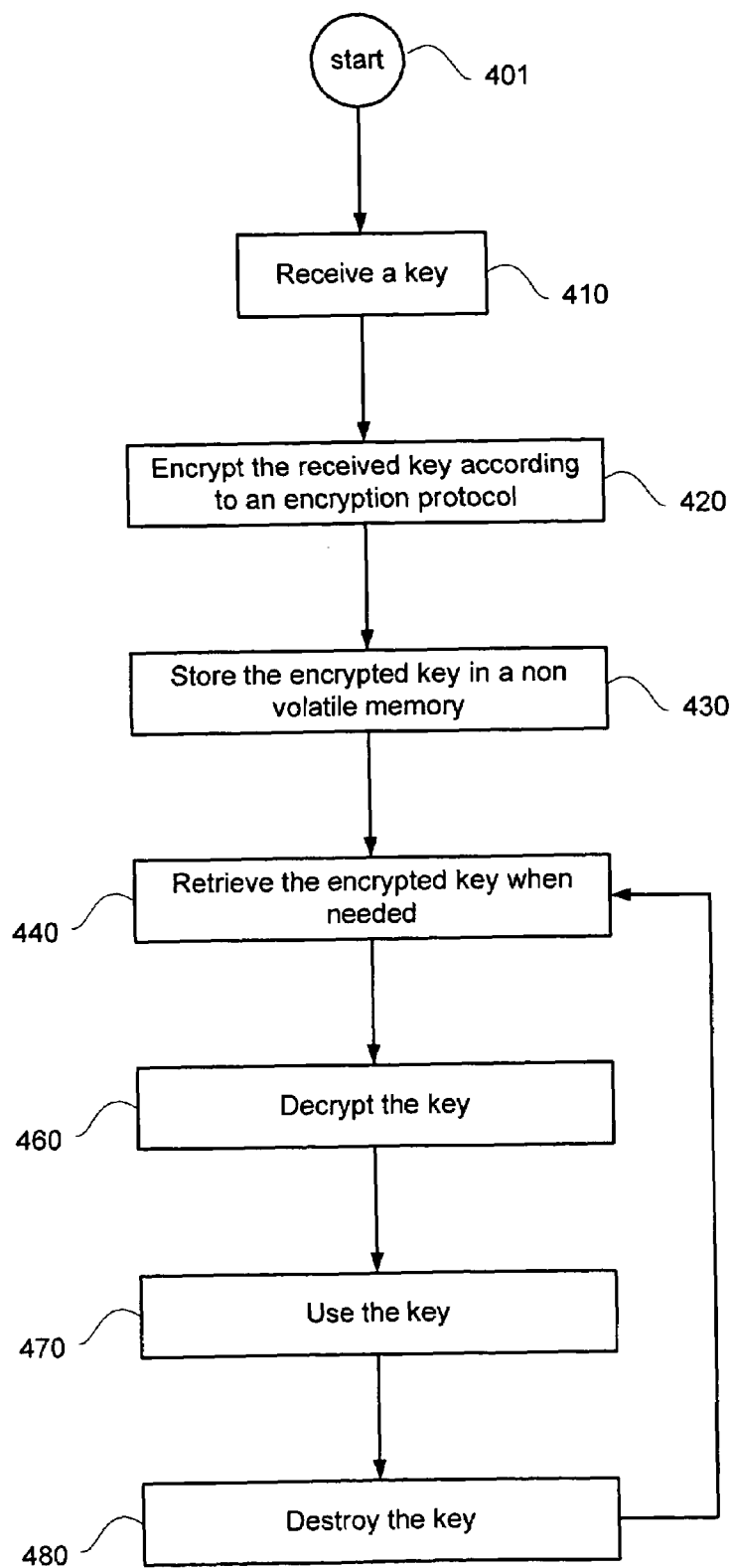
FIG. 4 is a flow-chart illustrating a method in accordance with the present invention.

FIG. 4 is a flow chart illustrating a method in accordance with the present invention. The method is described with reference to display unit 170 for illustration. The method starts in step 401 in which control passes to step 410. In step 410, display unit 170 receives a key. In step 420, display unit 170 decrypts the key according to an encryption protocol. As noted above, display unit 170 may be designed to encrypt the key using one of several encryption protocols. In step 430, display unit 170 stores the encrypted key in a non-volatile memory. The non-volatile memory may be located within display unit 170 as described above. In addition, the memory may be implemented with components such as entire memory modules (e.g., EEPROM) or using a small memory units such as registers.

In step 440, display unit 170 may retrieve the encrypted key when needed. A need arises according to the specific purpose for which the key is designed for. For example, if the key is used for encryption, the key is retrieved prior to decryption of the corresponding data. In step 460, display unit 170 decrypts the key consistent with the encryption protocol used above. In step 470, display unit 170 uses (e.g., for authentication or decryption of data) the decrypted key. Display unit 170 may retrieve the keys any number of times as indicated by the loop shown in FIG. 4.

Thus, a display unit provided in accordance with the present invention may store any keys in an encrypted form in a non-volatile memory, and decrypt the key only when actually required for use. As a result, the keys may not be easily deciphered and accessed by an unauthorized third party. In addition, it should be understood that steps 410–430 are performed usually by an OEM at the time of assembling the display units, and the loop of steps 440–470 is performed when a end user uses the display unit later.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of using and storing a cryptography key in a display unit, comprising:

retrieving a first encrypted key from anon-volatile memory incorporated in the display unit;

generating a first decrypted key by decrypting the first encrypted key according to a first encryption protocol;

receiving a plurality of pixel data elements encoded in a display signal in an encrypted form that represents an image;

decrypting said encrypted plurality of pixel data elements using the first decrypted key;

generating said plurality of pixel data elements based upon said decrypted plurality of pixel data elements;

displaying said image on a display screen based on said decrypted plurality of pixel data elements;

destroying the first encrypted key;

receiving a second encrypted key from non-volatile memory that is different from the first encrypted key;

generating a second encrypted key by decrypting the second encrypted key according to a second encryption protocol that is different from the first encryption protocol;

decrypting a second encrypted plurality of pixel data elements using the second decrypted key;

generating a second plurality of pixel data elements based upon said second decrypted plurality of pixel data elements;

displaying said second decrypted plurality of pixel data elements.

2. A method as recited in claim 1, wherein said display signal is received according to TMDS format.

3. A computer program product stored on computer readable medium executable by a processor for using and storing a cryptography key in a display unit, comprising:

computer code for retrieving a first encrypted key from a non-volatile memory incorporated in the display unit;

computer code for generating a first decrypted key by decrypting the first encrypted key according to a first encryption protocol;

computer code for receiving a plurality of pixel data elements encoded in a display signal in an encrypted form that represent an image;

computer code for decrypting said encrypted plurality of pixel data elements using the first decrypted key;

computer code for generating said plurality of pixel data elements based upon said decrypted plurality of pixel data elements;

computer code for displaying said image on a display screen based on said decrypted plurality of pixel data elements;

computer code for destroying the first encrypted key;

computer code for receiving a second encrypted key from non-volatile memory that is different from the first encrypted key;

computer code for generating a second encrypted key by decrypting the second encrypted key according to a second encryption protocol that is different from the first encryption protocol;

computer code for decrypting a second encrypted plurality of pixel data elements using the second decrypted key;

computer code for generating a second plurality of pixel data elements based upon said second decrypted plurality of pixel data elements;

computer code for displaying said second decrypted plurality of pixel data elements; and a computer-readable medium for storing the computer code.

4. A method as recited in claim 1, wherein said display signal is received according to TMDS format.

5. The method as recited in claim 1, further comprising receiving a cryptography-related command.

6. The method as recited in claim 5, wherein the cryptography command includes an authentication request and a number of associated authentication request parameters.

7. The method as recited in claim 6, wherein the authentication request is an HDCP authentication request.

8. The method as recited in claim 7, further comprising:

retrieving an encrypted authentication key from the non-volatile memory corresponding to the authentication request; and decrypting the authentication request based upon a corresponding decryption protocol.

9. The method as recited in claim 8, further comprising:

responding to the authentication request based on the decrypted authentication request.

10. Computer program product as recited in claim 3, wherein the key is one of a plurality of keys and further comprising:

computer code for providing a number of the plurality of keys.

11. Computer program product as recited in claim 10, further comprising:

computer code for selecting one of the number of available encryption protocols for each of the provided keys; and computer code for encrypting each of e provided keys based upon a particular one of the selected encryption protocols.

12. Computer program product as recited in claim 11, further comprising:

computer code for storing the encrypted keys in the non-volatile memory.

13. Computer program product as recited in claim 12, further comprising:

computer code for decrypting selected ones of the stored encrypted keys, as needed.

14. Computer program produit as recited in claim 13, wherein the plurality of keys includes a decryption key and an authentication key.

15. Computer program product as recited in claim 14, further comprising:
   computer code for receiving a cryptography related command.

16. Computer program product as recited in claim 15 wherein the cryptography command includes an authentication request and a number of associated authentication request parameters.

17. Computer program product as recited in claim 16, wherein the authentication request is an HDCP authentication request.

18. Computer program product as recited in claim 17, further comprising:
   computer code for retrieving an encrypted authentication key from the non volatile memory corresponding to the authentication request; and
   computer code for decrypting the authentication request based upon a corresponding decryption protocol.

19. Computer program product as recited in claim 18, further comprising:
   computer code for responding to the authentication request based on the decrypted authentication request.

* * * * *

UNITED STATES PATENT AND TRADEMARK OFFICE
CERTIFICATE OF CORRECTION

PATENT NO. : 7,206,943 B2
APPLICATION NO. : 10/813346
DATED : April 17, 2007
INVENTOR(S) : Osamu Kobayashi et al.

It is certified that error appears in the above-identified patent and that said Letters Patent is hereby corrected as shown below:

| COLUMN | LINE | |
|---|---|---|
| 7 (Claim 1) | (line 24) | "from anon-volatile memory" should read --from a non-volatile memory-- |
| 7 (Claim 1) | (line 39) | "receiving a second encrypted key from non-volatile memory" should read --receiving a second encrypted key from the non-volatile memory-- |
| 7 (Claim 1) | (line 41) | "generating a second encrypted key" should read --generating a second decrypted key-- |
| 8 (Claim 3) | (line 9) | "receiving a second encrypted key from non-volatile memory" should read --receiving a second encrypted key from the non-volatile memory-- |
| 8 (Claim 3) | (line 11) | "computer code for generating a second encrypted key" should read --computer code for generating a second decrypted key-- |
| 8 (Claim 11) | (line 54) | "computer code for encrypting each of e provided keys" should read --computer code for encrypting each of the provided keys-- |

Signed and Sealed this

Twenty-sixth Day of May, 2009

JOHN DOLL
*Acting Director of the United States Patent and Trademark Office*